3,108,132
PURIFICATION OF DMT BY FILTRATION
Aubrey R. McKinney, Grand Prairie, Tex., assignor to Standard Oil Company, Chicago, Ill., a corporation of Indiana
No Drawing. Filed Jan. 16, 1962, Ser. No. 167,222
1 Claim. (Cl. 260—475)

This invention relates to aromatic acid esters. More particularly the invention concerns a method for improving the color stability of lower alkanol diesters of benzene dicarboxylic acids. Even more particularly the invention concerns a method for obtaining highly purified dimethylterephthalate suitable for use in the production of film and fiber-forming linear super polyesters.

Linear super polyesters, for example those prepared by the polymerization of the reaction product of ethylene glycol and lower alkanol esters of terephthalic acid or mixtures of terephthalic and isophthalic esters, have recently become of significant commercial interest. These polyesters should be free of undesirable color, requiring the use of starting materials which are themselves color free. For instance, in the production of fiber grade polyesters from dimethylterephthalate it is highly desirable that the starting material exhibit a color of not more than 100 and preferably less than 50 after 72–84 hours in the molten state at 175° C. (Color values given are determined by comparison with American Public Health Association, "APHA," color standards.)

Dimethylterephthalate is obtained commercially by the esterification of terephthalic acid with methanol. The crude product can be purified by vacuum distillation to yield a purified ester product which is extraordinarily pure by comon industrial standards—on the order of 99.9+ mol percent. But even this uncommonly pure dimethylterephthalate contains some color-forming impurities which, under the influence of elevated temperatures, will cause discoloration of the product and render it undesirable for use as a starting material in the polyester fiber process. Numerous methods have been proposed to combat this color instability such as carefully controlled fractional recrystallization, the use of color inhibiting additives and so forth.

I have now discovered that the discoloration of lower alkanol esters of benzene dicarboxylic acids can be dramatically reduced by separating therefrom subliminal particles of impurities which cause discoloration of the esters. My method is based on the surprising discovery that even after the hereinbefore described purification steps have ben performed the highly purified esters still contain trace amounts of impurities which are insoluble in either the molten ester or a solution of the ester in an appropriate solvent such as chloroform and that these impurities are a principal cause of the discoloration of the ester.

The composition of these insoluble particles is as yet unknown; they are invisible to the naked eye but appear as tiny snowflake-like particles in a Tyndall beam. In very impure dimethylterephthalate or in relatively pure material which has a long molten history they may tend to coalesce or agglomerate and form larger but still invisible lint-like particles.

Another very important feature of my invention is based on my even more surprising discovery that the separation of the particles from the ester must be performed before the color formation occurs—if performed afterwards the particles are removed but no improvement in color stability of the ester is achieved. Furthermore, if particles separated from one portion are allowed to remain in contact with an unseparated ester-particle mixture the color stability of the latter portion is greatly reduced.

I have found that, in general, the color stability of the ester is dependent on the amount of the hereinabove described particles present. Thus, partial removal gives some improvement in color stability; best results are obtained when essentially all of the particles are removed. In a preferred embodiment of my invention the particles are removed by filtration. I have found that filters having a porosity of 40–60 microns give essentially no particle removal and no appreciable improvement in color stability; a filter having a porosity of 10–15 microns gives partial removal and a corresponding partial improvement in color stability, while a porosity of 4 to 5.5 microns is very effective to remove all appreciable amounts of particles in the 5–10 micron range and substantially complete removal of particles larger than 10 microns, giving a dramatic improvement in color stability. I prefer not to attempt to remove particles smaller than 5 microns as the filters necessary to remove these particles must be inordinately large to achieve an economical production rate and any incremental benefit obtained is relatively small.

The filtration step can be accomplished while the ester is in the molten state. For example, in a preferred embodiment of my invention I filter molten dimethylterephthalate at a temperature between about 150° C. and 200° C. Alternatively, I may carry out the filtration with the ester in solution. In one embodiment of the invention I filter a solution of dimethylterephthalate in chloroform. It will be appreciated by those skilled in the art that a solvent for the particular ester being treated must be selected with a view toward dissolving the ester while leaving the impurity particles undissolved.

While I prefer to separate the particles from the ester by filtration, other known solid-liquid separation techniques such as centrifugation and so forth may be applied without departing from the spirit and scope of my invention.

For the better understanding of the method of my invention I offer the following specific examples.

*Example I*

This example illustrates the improved color stability which can be obtained by the method of my invention and the desirability of separating the solids obtained from the filtered portion from the unfiltered portion.

A sample of crude dimethylterephthalate prepared by the esterification of terephthalic acid which was obtained by the catalytic liquid phase oxidation of paraxylene was fractionally distilled at 80 mm. Hg absolute pressure. The impurity-rich forecut and bottoms fractions were rejected and a high purity heartcut was retained. Immediately after distillation the molten heartcut appeared clear to the naked eye but in a Tyndall beam the melt appeared to be opalescent; closer inspection revealed that the opalescence was caused by tiny snowflake-like particles suspended in the melt. A sample of the molten Tyndall-opalescent heartcut was filtered through a 4.5–5 micron porosity filter. Inspection of the filtrate in a Tyndall beam revealed essentially complete removal of the particles. Samples of the filtered ester and of the unfiltered ester containing the solids removed from the filtered portion were placed in a tube immersed in constant temperature bath and heated for 24 hours at 175±3° C. After the completion of the heating period the filtered portion exhibited a color of 50 APHA while the unfiltered portion exhibited a color of 450 APHA.

*Example II*

A sample of dimethylterephthalate derived from the same source as the ester of Example I was subjected to the same distillation procedure described therein. The distilled product was then remelted, passed through a melt tank and flaked in a drum flaker. This flaking process added about 6 hours to the molten history of the product. The flaked distilled ester was then melted. The melt contained the fine snowflake particles of Example I and also contained lint-like particles. Both types of particles were visible only in a Tyndall beam. The melt was divided into two portions. One portion was filtered as in Example I and the solids were discarded. The filtrate was placed in a tube and heated at $175°\pm3°$ C. for 168 hours in the constant temperature bath of Example I. At the end of the heating period the filtered ester exhibited a color of 40 APHA. A sample of the unfiltered portion subjected to the same heating procedure exhibited a color of 400 APHA.

*Example III*

A sample of briquetted dimethylterephthalate obtained commercially in high purity from a different source than the esters of Examples I and II was melted. The melt contained snowflake-like particles similar to those observed in Examples I and II. A portion of the melt was filtered as in Example I and the solids discarded. After 168 hours' heating at $175\pm3°$ C. in the constant temperature bath of Example I the filtered portion exhibited a color of 90–100 APHA and the unfiltered portion had a color of 500 APHA.

*Example IV*

A sample of dimethylterephthalate obtained as in Example I is distilled as in Example I and the heartcut is then maintained in the molten state at elevated temperature until an appreciable amount of discoloration occurs. Examination of the melt in a Tyndall beam reveals the presence of the hereinbefore described particles. Upon filtration of the melt as hereinbefore described the particles are removed but the color stability of the filtered ester is not appreciably improved over that exhibited in the absence of filtration.

From the foregoing examples it is apparent that I have discovered a highly effective method for improving the color stability of benzene dicarboxylic acid diesters. The equipment necessary for carrying out my method is simple and inexpensive and can be easily incorporated into existing equipment necessitating only minor modifications. While I have exemplified my invention by its application to improving the color stability of dimethylterephthalate, I do not intend to thereby limit the scope of my invenion to the specific material employed for purposes of illustration. My method can also be employed to improve the color stability of diesters of terephthalic acid derived from other aliphatic alcohols such as ethanol, propanol, isopropanol, butanol, isobutanol and so forth, and to diesters of methanol, ethanol, propanol, isopropanol, butanol, isobutanol and the like with isophthalic and orthophthalic acids.

Having fully disclosed my invention and the preferred embodiments thereof, I claim:

The method of improving the color stability of dimethylterephthalate which contains impurities in the form of particles which are insoluble in molten dimethylterephthalate and which are invisible to the naked eye but appear as tiny snowflake-like particles in a Tyndall beam, comprising passing said dimethylterephthalate in molten form through a filter having a porosity not greater than about 10–15 microns prior to any substantial discoloration of said dimethylterephthalate.

References Cited in the file of this patent

UNITED STATES PATENTS

| | | |
|---|---|---|
| 2,825,737 | Saffer et al. | Mar. 4, 1958 |
| 2,825,738 | Ellendt et al. | Mar. 4, 1958 |
| 2,905,708 | Peterson et al. | Sept. 22, 1959 |